(12) United States Patent
Huang

(10) Patent No.: US 6,443,479 B2
(45) Date of Patent: Sep. 3, 2002

(54) LOCKING DEVICE WITH SAFETY ARRANGEMENT FOR COLLAPSABLE STROLLER

(75) Inventor: Ying-Yuan Huang, Chia-I (TW)

(73) Assignee: Lerado (Zhong Shan) Industrial Co., Ltd., Zhong Shan (CN)

( * ) Notice: Subject to any disclaimer, the term of this patent is extended or adjusted under 35 U.S.C. 154(b) by 0 days.

(21) Appl. No.: 09/805,052

(22) Filed: Mar. 14, 2001

(30) Foreign Application Priority Data

Jul. 26, 2000 (CN) ........................................ 00228933 U

(51) Int. Cl.⁷ .............................. B62B 1/00; B62B 3/00; B62B 5/00; B62B 7/00; B62B 9/00
(52) U.S. Cl. .................... 280/642; 280/650; 280/655
(58) Field of Search ................................ 280/639, 642, 280/647, 648, 650, 655, 657, 658

(56) References Cited

U.S. PATENT DOCUMENTS

| | | | |
|---|---|---|---|
| 4,832,361 A | * 5/1989 | Nakao et al. | 280/642 |
| 4,846,494 A | * 7/1989 | Kassai | 280/642 |
| 4,915,401 A | * 4/1990 | Severson et al. | 280/643 |
| 5,511,441 A | * 4/1996 | Arai | 280/642 |
| 5,524,503 A | * 6/1996 | Ishikura | 280/642 |
| 5,535,483 A | * 7/1996 | Cabagnero | 280/642 |
| 5,871,227 A | * 2/1999 | Huang | 280/642 |
| 5,979,928 A | * 11/1999 | Kuo | 280/642 |
| 6,129,373 A | * 10/2000 | Cheng | 280/647 |

FOREIGN PATENT DOCUMENTS

| | | | | |
|---|---|---|---|---|
| JP | 396474 | * | 4/1991 | 280/642 |
| JP | 3186474 | * | 8/1991 | 280/642 |

* cited by examiner

*Primary Examiner*—Jack Lavinder
*Assistant Examiner*—Devon Kramer
(74) *Attorney, Agent, or Firm*—Birch, Stewart, Kolasch & Birch, LLP

(57) ABSTRACT

A locking device for collapsable stroller is located at the gripping portion of handle. The locking device comprises a housing, a pair of meshed driving members in the housing pivotal in opposite directions a push button engaged with driving members, and a pair of steel cables coupled to the driving members. Whereby press push button to pull steel cables toward the center of gripping portion, thereby unlocking the latches so as to unfold the stroller. The stroller further comprises a safety mechanism at the upper side of one driving member. Safety mechanism comprises a pawl-like member blocks the push button in the locked state of the stroller, thus preventing latches from accidentally being unlocked.

7 Claims, 5 Drawing Sheets

LOCKING DEVICE WITH SAFETY ARRANGEMENT FOR COLLAPSABLE STROLLER

BACKGROUND OF THE INVENTION

1. Field of Invention

The present invention relates to strollers and more particularly to a locking device with an additional safety mechanism for collapsable stroller.

2. Related Art

Collapsable strollers has been used around the world. Typically, a locking device is mounted on such a collapsable stroller. In collapsing the stroller, first rotate the locking device to move connecting rods up, thereby disengaging sliding blocks from catches. Then, user may collapse the stroller in this unlocked position. But this is unsatisfactory for the purpose for which the invention is concerned for the following reasons:

1. The locking device is unsightly because it is projected from the stroller.
2. The collapsing operation is not simplified since, as stated above, the locking device is required to rotate to move connecting rods up for disengaging sliding blocks from catches before user bends his/her back to collapse the stroller.
3. Connecting rod is movable. Also, a gap may exist between connecting rod and stroller frame while collapsing the stroller. Hence, it is possible to hurt user if hands are accidentally put into the gap.

Thus, it is desirable to provide an improved locking device with an additional safety arrangement for collapsable stroller in order to overcome the above drawbacks of prior art.

SUMMARY OF THE INVENTION

It is therefore an object of the present invention to provide a locking device for collapsable stroller whereby press pushing portion and thus engagement portion of push button pivot two driving members in two different opposite directions such that two coupled steel cables are pulled toward the center of gripping portion, thereby unlocking the latches so as to unfold the stroller thereafter.

It is another object of the present invention to provide a locking device for collapsable stroller. The stroller further comprises a safety mechanism at the upper side of one driving member. Safety mechanism comprises a pawl-like member blocks the push button in the locked state of the stroller, thus preventing latches from accidentally being unlocked.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become fully understood from the detailed description given hereinbelow illustration only, and thus are not limitative of the present invention, and wherein.

DETAILED DESCRIPTION OF THE INVENTION

Figure 1:
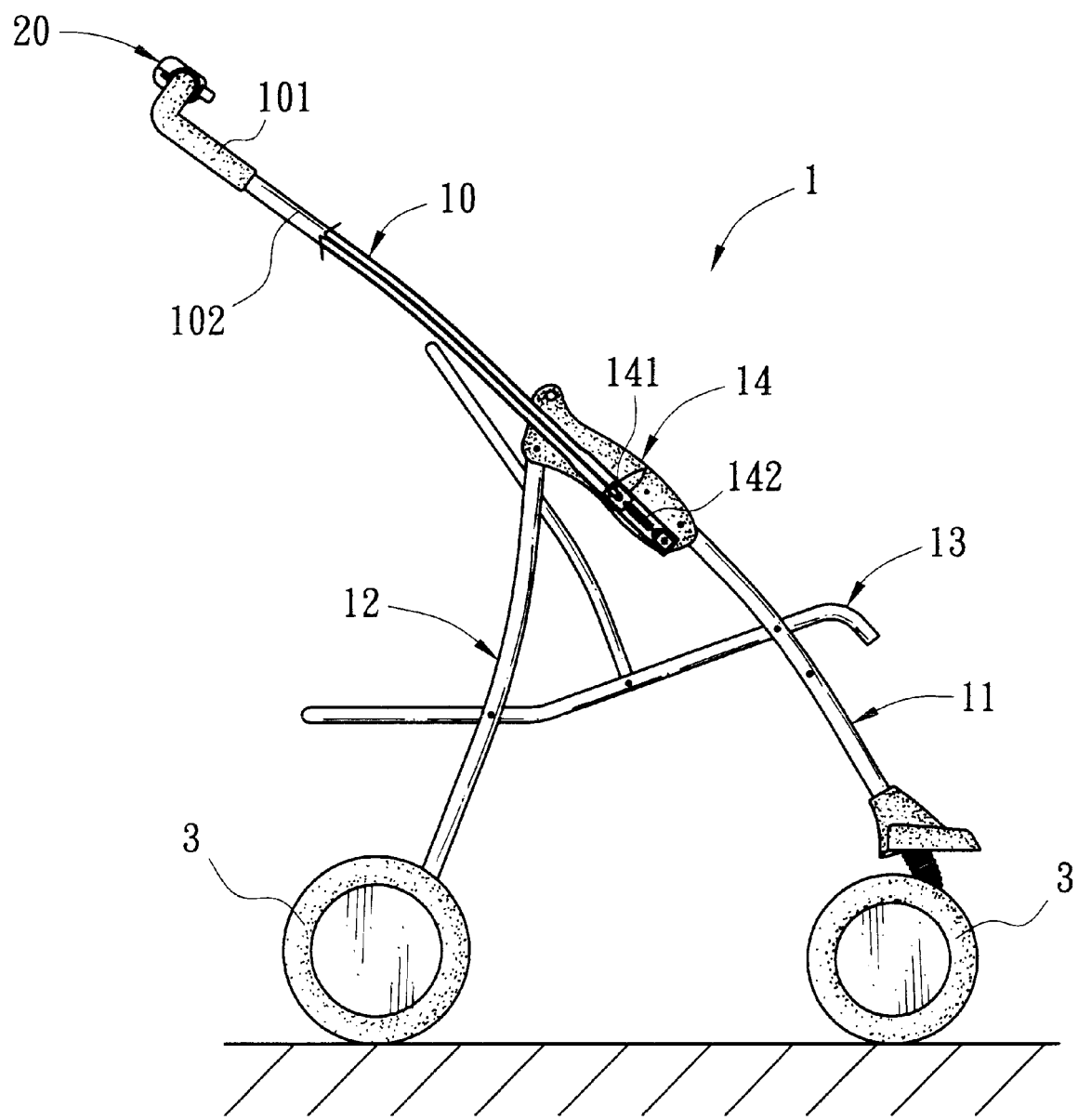
FIG. 1 is a schematic side view of the unfolded frame of a collapsable stroller incorporating the locking device with safety mechanism according to the invention.
Figure 5:
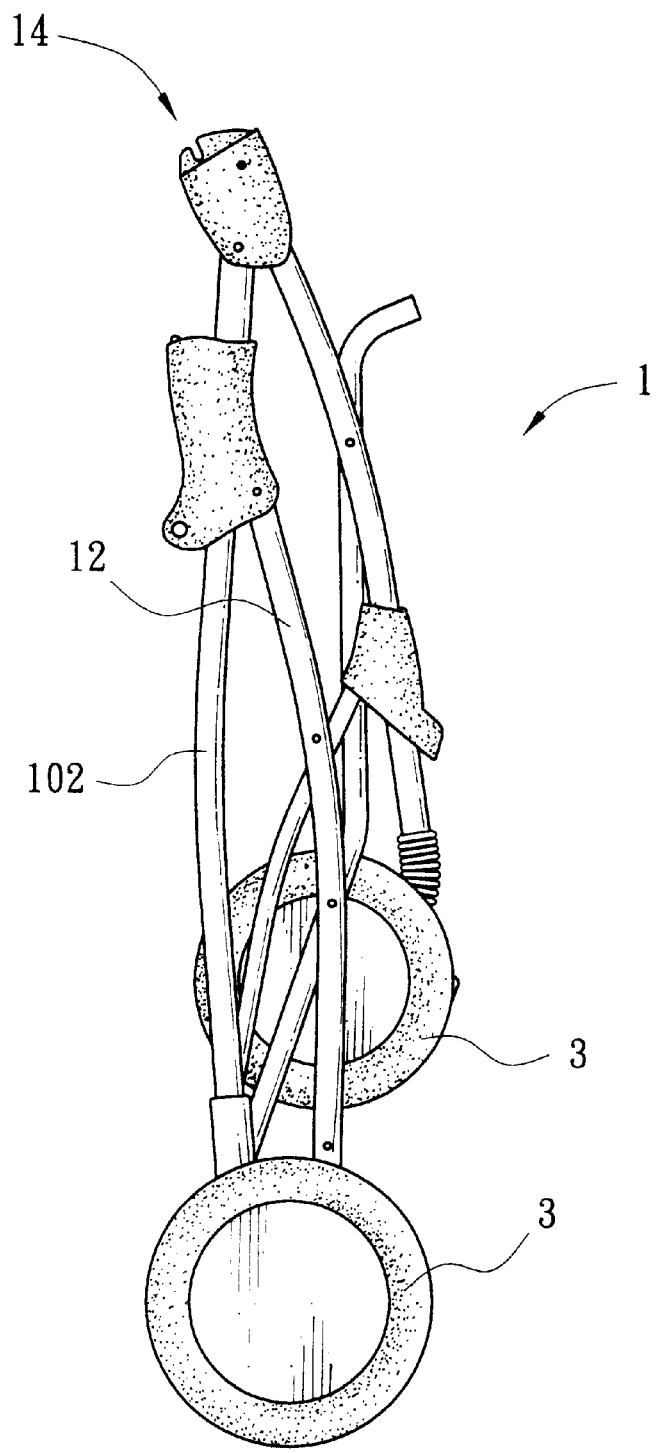
FIG. 5 is a schematic side view of the collapsed stroller frame shown in FIG. 1.

Referring to the drawings and particularly FIG. 1, there is shown a collapsable stroller in accordance with the invention comprising a frame 1 and a plurality of sets of wheels 3 rotatably mounted under the frame 1. The frame comprises a handle 10, front legs 11, rear legs 12, seat tubes 13, latches 14, and a locking device 20. Handle 14 comprises a gripping portion 101 and two arms 102. Latch 14 comprises a latch pin 141 and a helical spring 142. User may manipulate locking device 20 to control the locking or unlocking of latch pin 141 for unfolding the stroller in a use position as shown in FIG. 1 or folding the stroller in a storage position as shown in FIG. 5.

Figure 2:
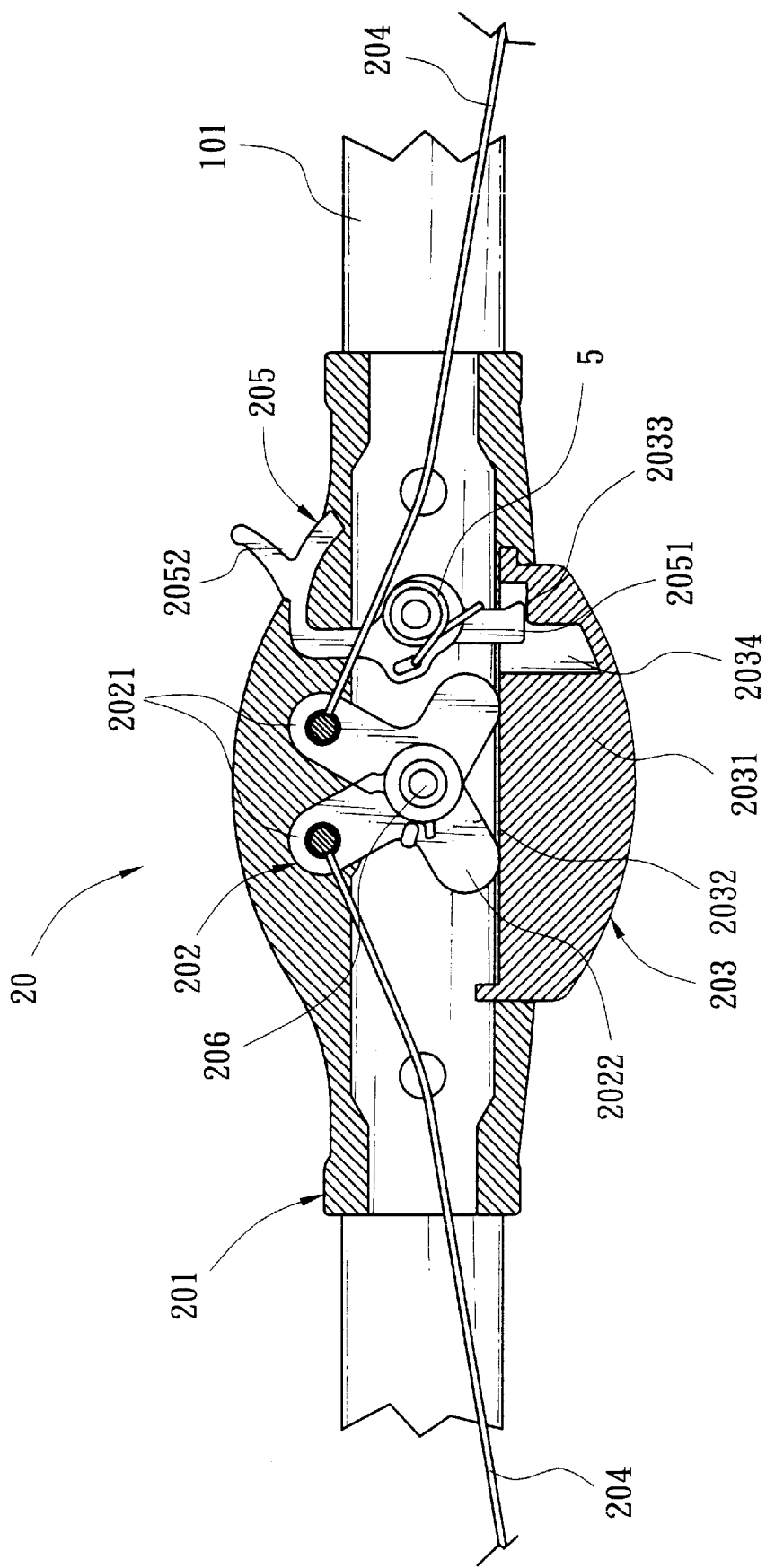
FIG. 2 schematically shows the components of locking device and safety mechanism of the stroller shown in FIG. 1.
Figure 3:
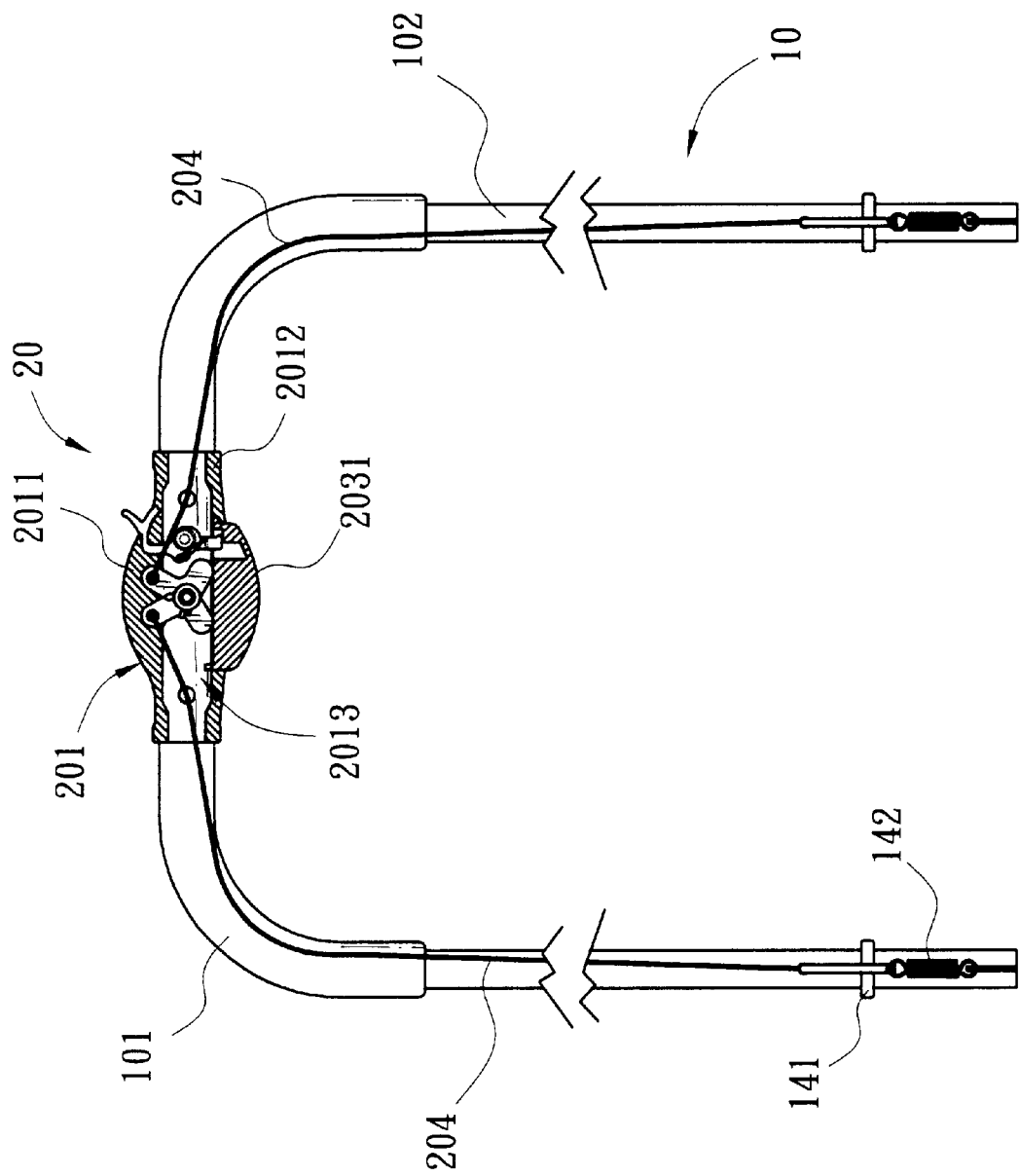
FIG. 3 is a schematic plan view of the handlebar portion including locking device and safety mechanism of FIG. 2.

Referring to FIGS. 2 and 3 specifically, locking device 20 located at the gripping portion 101 of the handle 10 comprises a housing 201, a pair of opposite driving members 202, a push button 203, a pair of steel cables 204, and a safety mechanism 205. Housing 201 comprises an upper portion 2011, a lower portion 2012, and a space 2013 enclosed by portions 2011 and 2012. Each driving member 202 is pivotably connected to gripping portion 101 of handle 10. Driving member 202 comprises a first cam 2021 coupled to one end of steel cable 204 and a second cam 2022. Push button 203 comprises a projected activation portion 2031 and an engagement portion 2032. Push button 203 is located at the underside of driving members 202 and slidable in housing 201.

Figure 4:
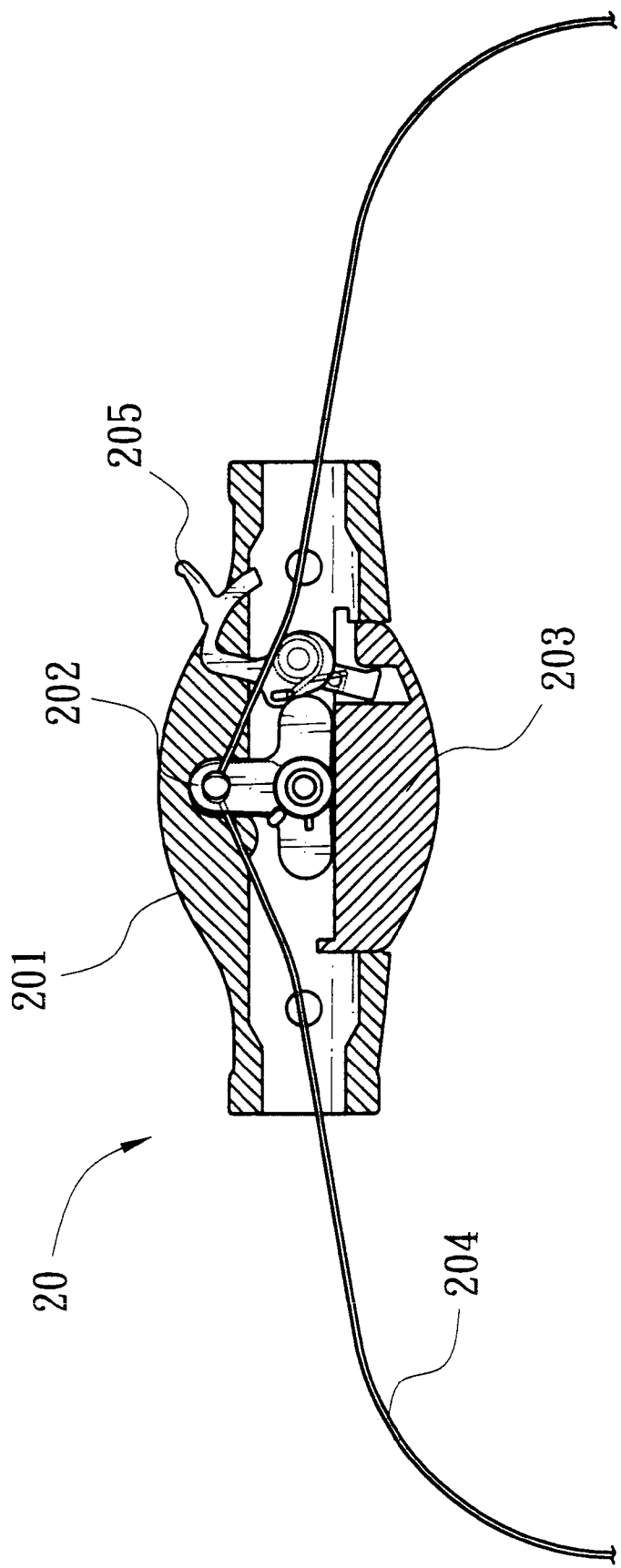
FIG. 4 schematically shows the unlocking operation of the locking device and safety mechanism of FIG. 2.

Referring to FIGS. 3 and 4 specifically, the operation of locking device 20 will now be described. As shown, press activation portion 2031 (and thus engagement portion 2032) of push button 203 to cause second cams 2022 of driving members 202 to pivot in opposite directions. Thus first cams 2021 are pivoted toward each other to substantially overlay. Hence, two steel cables 204 are pulled toward each other (i.e., toward the center of gripping portion 101. At the same time, latch pins 141 coupled to the other ends of steel cables 204 are activated for unlocking the latches 14 in response to the pulling movement of steel cables 204. Thus, user may fold the stroller. In unfolding the stroller, springs 142 in the arms 102 are expanded to return to original unbiased state for causing push button 203 and driving members 202 to return to their positions in the locked state of stroller.

Referring to FIGS. 2 and 4 specifically, an additional safety mechanism 205 is slidably mounted on the housing 201 for preventing latch pins 141 from accidentally unlocked. Safety mechanism 205 comprises a torsional spring 5 in the space 2013, a pawl-like member 2051, and a projected activation portion 2052. And the push button 203 including a blocking side 2033 and a releasing groove 2034. In the locked position, pawl-like member 2051 of safety mechanism 205 blocks the blocking side 2033 of the push button 203, thus inhibiting the push button 203 from moving toward the housing 201. And the torsional spring 5 maintains the safety mechanism 205 at this position. In collapsing the stroller, push activation portion 2052 to let safety mechanism 205 pivot so that pawl-like member 2051 leaves the blocking side 2033 for position corresponding the releasing groove 2034. Then push button 203 toward inside the housing 201, and user is allowed to fold the stroller. In view of above, the safety of manipulating stroller is greatly enhanced.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A locking device mounted on a collapsible stroller, said stroller including a frame having a handle and a plurality of sets of wheels rotatably mounted under said frame, said locking device located at said handle of said stroller, said locking device comprising:

a housing including a receiving space;

a push button being slidable in said housing including a projected activation portion, an engagement portion, a blocking side and a releasing groove;

a pair of driving members connected pivotably to said handle corresponding with said push button, each of said driving members having a first cam and second cam;

a pair of steel cables each having one end coupled to said locking device and the other end coupled to said first cam; and a safety mechanism slidably mounted on said housing, said safety mechanism including a projecting activation portion and a pawl-like member blocking said blockingside of said oush button for inhibiting said push button from moving toward said housing;

whereby a push of said activation portion of said safety mechanism lets said safety mechanism pivot so that said pawl-like member leaves said blocking side for a position corresponding to said releasing groove, and a press of said push button toward inside of said housing pivots the cams of said driving members in opposite directions for pulling said steel cables toward the center of said housing.

2. The locking device of claim 1 wherein said frame further comprises a plurality of front legs, a plurality of rear legs, and a pair of latches.

3. The locking device of claim 2, wherein each latch comprises a latch pin and a spring attached to said latch pin.

4. The locking device of claim 1, wherein said housing further comprises an upper portion and a lower portion.

5. The locking device of 1, wherein said driving members are overlapped and pivotably connected to the same point of said handle.

6. The locking device of claim 1, where said handle comprises a gripping portion and two arms.

7. The locking device of claim 1, wherein said safety mechanism further comprises a torsional spring in said receiving space maintains said pawl-like member to block said blocking side of said push button when said locking device is not manipulated.

* * * * *